United States Patent [19]

Yamamoto

[11] Patent Number: 5,406,833
[45] Date of Patent: Apr. 18, 1995

[54] ATOMIC FORCE MICROSCOPE

[75] Inventor: Hiroyoshi Yamamoto, Tokyo, Japan

[73] Assignee: Seiko Instruments, Inc., Japan

[21] Appl. No.: 106,409

[22] Filed: Aug. 13, 1993

[30] Foreign Application Priority Data

Sep. 2, 1992 [JP] Japan .................................. 4-234997

[51] Int. Cl.⁶ .......................... G01B 5/28; H01J 37/26
[52] U.S. Cl. ...................................... 73/105; 250/306; 250/307
[58] Field of Search .................. 73/105; 250/306, 307, 250/423 F

[56] References Cited

U.S. PATENT DOCUMENTS

| | | | |
|---|---|---|---|
| 4,999,495 | 3/1991 | Miyata et al. | 250/306 |
| 5,025,658 | 6/1991 | Elings et al. | 73/105 |
| 5,107,114 | 4/1992 | Nishioka et al. | 73/105 |
| 5,144,833 | 9/1992 | Amer et al. | 73/105 |
| 5,189,906 | 3/1993 | Elings et al. | 73/105 |
| 5,193,383 | 3/1993 | Burnham et al. | 73/105 |
| 5,245,863 | 9/1993 | Kajimura et al. | 73/105 |
| 5,260,824 | 11/1993 | Okada et al. | 73/105 |
| 5,280,341 | 1/1994 | Nonnenmacher et al. | 250/306 |
| 5,286,977 | 2/1994 | Yokohama et al. | 250/306 |
| 5,289,004 | 2/1994 | Okada et al. | 250/306 |

Primary Examiner—Hezron E. Williams
Assistant Examiner—George W. Dombroske
Attorney, Agent, or Firm—Adams & Wilks

[57] ABSTRACT

In an atomic force microscope capable of permitting the non-destructive testing of a large sample, a fine motion element is provided for three-dimensional scanning of the sample in order to determine the surface topography thereof. The fine motion element has attached thereto one end of a small spring element, and a detecting tip is connected to the opposite end of the spring element for positioning the end portion of the spring element proximate the sample surface. A displacement detector detects displacement of the spring element by detecting laser light obtained by irradiating a laser beam on the rear surface of the spring element and detecting the displacement using a multi-segment photodetector. Since the fine motion element does not support the sample, the three-dimensional relative scanning of the sample surface by the detecting tip is possible even for large-sized samples.

12 Claims, 4 Drawing Sheets

ATOMIC FORCE MICROSCOPE

BACKGROUND OF THE INVENTION

The present invention relates to atomic force microscopes of the systems in which displacements converted from interatomic forces acting between substances by using very small spring elements are detected by a photodetector element as a displacement of reflection light obtained by irradiating laser beams on the spring elements thereby to produce control signals.

An atomic force microscope (Atomic Force Microscope), since it has been invented (Physical Review Letters vol. 56 p930 1986) by G. Binnig et al who are the inventors of STM, has been promoted of researches and studies under expectation as a surface shape observation means for novel insulative substances. The principle thereof is that interatomic forces acting between a detecting tip having a sufficiently sharp point and a sample is measured as a displacement of the spring element attached with the detecting tip, the sample surface are scanned while maintaining the displacement amount of the spring element at constant, so that the shape of the sample surface is measured using, as a shape information, a control signal for maintaining the displacement amount of the spring element constant.

For a displacement detecting means of the spring element, an example referred to as an beam deflection system (Journal of Applied Physics 65(1), 1 p164 January 1989) has been reported wherein the positional displacement of the reflection light obtained by irradiating the laser beam on the spring element is detected by the photodetector element to produce a displacement signal.

FIG. 3 shows an operational principle of the atomic force microscope.

FIG. 4(a) is a conceptual view showing a relationship of interatomic forces versus interatomic distances. When two atoms approximate with each other at a distance of several nanometers or several Angstroms, the so-called Van der Waals force proportional to the minus seventh power of the interatomic distances are generated as an attractive force attracting with each other. When more approximating, then the so-called repulsive force arises suddenly.

FIG. 4(b) is a conceptual view showing a profile where a spring element 3 is being displaced. The conventional atomic force microscope obtains shape data of the sample surface in that the scanning is performed in the inside direction of the sample surface while a sample 1 is being adjusted in the z direction so that displacement amount "x" in the drawing is made constant. For a difference from the so-called tracer type roughness meter which uses a pressure of several milligrams for the sensor during the measurement, the atomic force microscope uses a pressure of as small as equal to or less than a microgram and has a very higher resolution and the like properties in spite of a narrower observation range than that of the roughness meter.

FIG. 3 is a schematic view showing the atomic force microscope of this conventional optical lever type. The spring element 3 is attached with a detecting tip 2 for limiting an interaction with the sample 1 into a minute portion to constitute a detector for detecting a very small force. The sample 1 is supported by a fine motion element 4, and a fine motion mechanism 4 is further supported by a coarse motion element 5. The detecting tip 2 is three dimensionally driven so as to be positioned at an interatomic force measurement region of the surface of the sample 1. The spring element 3 is attached on a frame 30, which fixes a coarse motion mechanism 5, where the example 1 is three dimensionally driven relative to the tip end portion of the detecting tip 2 by the fine motion element 4. That is, the sample 1 is scanned on the flat surface of the example 1 at a high resolution by the fine motion element 4 while adjusting a distance between the tip end portion of the detecting tip 2 and the surface of the example 1. Since a fine motion amount equal to or less than a nanometer is required, a good amount of cases use piezoelectric elements as a fine motion element. The fine motion element 4 is fixed on the coarse motion mechanism 5 for performing the rough positioning of the example 1 and the spring element 3.

The rear surface-side of the spring element 3 is provided thereon with a displacement detecting system for detecting a displacement amount of the spring element 3. First, a light emitted from a semiconductor laser 6 is converged by a lens a8 and adjusted by an optical axis adjusting means 22 so as to be irradiated on the rear surface tip end portion of the spring element 3. The semiconductor laser 6 is driven by a laser driver 18. The spring element 3 is provided with coating for raising a reflection index. The reflected light is converged by a lens b9 on a two or four segmented position sensitive detector (PSD) 11. In case where, as a photodetector element, for example, two segmented photodetector 11a is used, an adjustment is made so that the light is incident uniformly on the previously splitted element, and then a difference signal is taken from between the two-segmented elements. When the spring element 3 is tilted by being pressed by the sample 1, an optical spot on a light receiving surface of the photodetector 11a is moved proportional to a tilt of the spring element 3, thus one-side output of the splitted elements increases, and the other-side decreases. As a result, the differential output comes proportional to the tilt of the spring element 3, i.e., the displacement. This displacement signal, which is taken into a servo system 20 after being amplified by a differential amplifier 19, is converted into a control signal fed to the fine motion element 4 and the coarse motion mechanism 5, and controlled for obtaining a constant distance between the example 1 and the spring element 3. The servo system 20 is coupled to computer 21.

However in the conventional optical lever type of atomic force microscope, because a driving system is employed to drive the sample by the fine motion element 4, an observation comes difficult with the decrease of a resonance frequency of the fine motion element if a larger sample intends to be observed. A small size of the fine motion element itself, for example, a diameter of 30 millimeters at most when a cylindrical type piezoelectric element is used, provides difficulty to physically attach the sample, and this requires cut of the sample, for example, for observing a semiconductor wafer and an optical disk substrate. For this reason, a drawback has been arisen because there can not be taken an advantage of non-destructive observation existing in the atomic force microscope.

Since the system for driving the sample by the fine motion element is used, a load mass of the fine motion element is varied at every time of measurement and a problem is that a control characteristic and a measurement speed are not constant.

SUMMARY OF THE INVENTION

To solve the problem described above, according to the present invention, a constitution is provided in that a spring element and a displacement detecting means are attached on a fine motion element. A tip end portion of the fine motion element is formed thereon with a displacement detecting system of an optical lever type composed of a semiconductor laser, a lens, the spring element, a mirror, and a photodetector element. An optical axis adjustment means of the displacement detecting system is provided in the external.

In accordance with the present invention, an atomic force microscope may comprise a spring element having a detecting tip at the end of said spring element for comverting an interatomic force into a displacement, said interatomic force is generated between surface of a sample and said detecting tip having a sharp tip end, a displacement detecting means for detecting said displacement of said spring element comprising a semiconductor laser for generating a laser beam and irradiating it on said spring element, and a photodetector for detecting said displacement of said laser beam reflected at said spring element, a coarse motion mechanism for moving said spring element relatively three-dimensionally, a fine motion mechanism having said displacement detecting means for moving the end of said detecting tip which is attached on the end of said spring element three-dimensionally within a region of the sample surface where said interatomic force acts, and a control means for maintaining a predetermined distance between said sample and said tip end of said detecting tip through said fine motion mechanism.

The atomic force microscope may further comprise a spring element position control means for movaly supporting said spring element in horizontal and adjusting a position of said spring element relative to said displacement detecting means.

The atomic force microscope may further comprise a photodetector position adjustment means for moving said linealy and adjusting the position of said photodetector.

The semiconductor laser is preferably a semiconductor chip without package.

The coarse motion mechanism may support said sample and allow said sample to move coarsely and three dimensionally.

The coarse motion mechanism may support said fine motion mechanism and allow said fine motion mechanism to move coarsely and three dimensionally.

The constitution as described above enables the sample to be separated from the fine motion element. When the sample is arranged on the coarse motion mechanism, the coarse motion mechanism which generally uses a pulse stage and the like loads a larger weight by several columns than a piezoelectric element ordinarily used as a fine motion element, thus a limitation to the size and weight of the sample is largely reduced. The same effect is exhibited even in case of forming the coarse and fine motion mechanism into one unitary configuration.

Further, since a freedom of constitution for the vicinity of the sample is improved, a freedom of design is correspondingly improved, for example, by performing an automatic exchange of the sample by combining with a carrier structure or the like arrangement.

Moreover, a load of the fine motion element is always constant, this guarantees a stabilization of the control system and a characteristic of the entire equipment.

DETAILED DESCRIPTION OF PREFERRED EMBODIMENTS

Embodiments according to the present invention are described with reference to the drawings.

Figure 1:
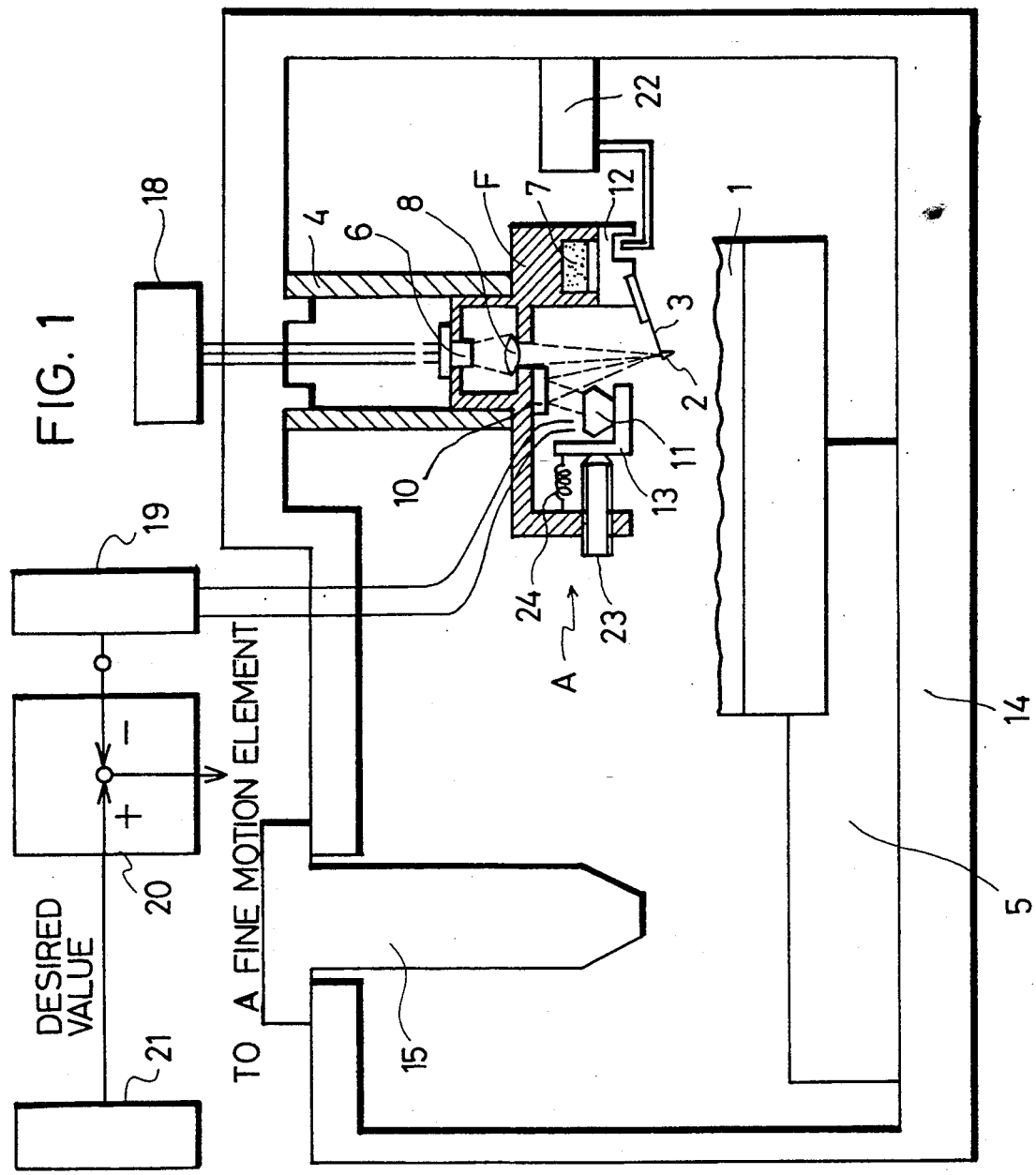
FIG. 1 is a block diagram showing an atomic force microscope according to the present invention.

FIG. 1 shows one embodiment of a structure of an atomic force microscope according to the present invention. A constitution of electrical equipment systems is the same as those of the conventional atomic force microscope. A displacement detecting system A, in which a semiconductor laser 6, a spring element 3, and a photodetector element 11 (for example, two or four segmented position sensitive detector) and the like are provided on a frame F, is attached on a tip end of a fine motion element 4, and a sample 1 is fixed on a coarse motion mechanism 5. The semiconductor laser 6, in which a laser element is mounted on a package with a diameter of equal to or less than 6 millimeter, has a weight as light as equal to or less than a gram, and this provides no problem on operation of the fine motion element 4. Moreover, it is possible to mount in a manner of the laser element itself without package. Thereby the displacement detecting system A with lighter weight can be obtained. The semiconductor laser 6 is driven by a laser driver 18.

The spring element 3, which is adhered to a holder 12 formed of iron family materials, is absorbed by a magnet 7, and fixed in tilt to an optical axis emitted from the lens a8. The light from the semiconductor laser 6 is converged in the vicinity of the tip end portion of the spring element 3 by the lens a8, and a position of a holder 12 is adjusted by an optical axis adjustment means 22 so that the optical axis is coincident to the tip end portion of the spring element 3. The optical axis adjustment means 22 is a two-axis stage mechansim. The optical axis adjustment means moves the spring element to a x or y direction to adjust the position of a detecting tip 2 which is attached on the spring element 3 to the optical axis of the semiconductor laser 6. A "U" letter member fixed on the adjusting means 22 is adapted to move the holder 12. The "U" letter member is driven by the holder 12 and push the holder 12 and moves it.

A reflection light from a rear surface of the tip end of the spring element 3 is incident on a two divided photodetector 11a fixed on the detector holder 13 through a mirror 10. The detector holder 13 is pressed onto an adjusting screw 23 through a coil spring 24, and can adjust a position of the photodetector 11a relative to the incident light by the adjusting screw 23. The photodetector 11 is coupled to a differential amplifier 19, and the differential amplifier 19 is coupled to a servo system 20 which is coupled to a computer 21.

The displacement detecting system thus constructed is functionally entirely the same as the conventional optical lever type atomic force microscope. Although a load to the fine motion element is somewhat larger than the conventional system to correspondingly lower an observation speed, there is no problem of its level in practical use.

A metallographic microscope 15 is provided in adjacent to the fine motion element section. The coarse motion mechanism 5 is formed of pulse stages in three axis directions x y z, the sample 1 is carried between the metallurgical microscope 15 and the atomic force microscope. Due to such construction, after the previous rough observation is performed by the metallographic microscope, a portion requiring a more detailed check can be observed by the atomic force microscope.

Figure 2:
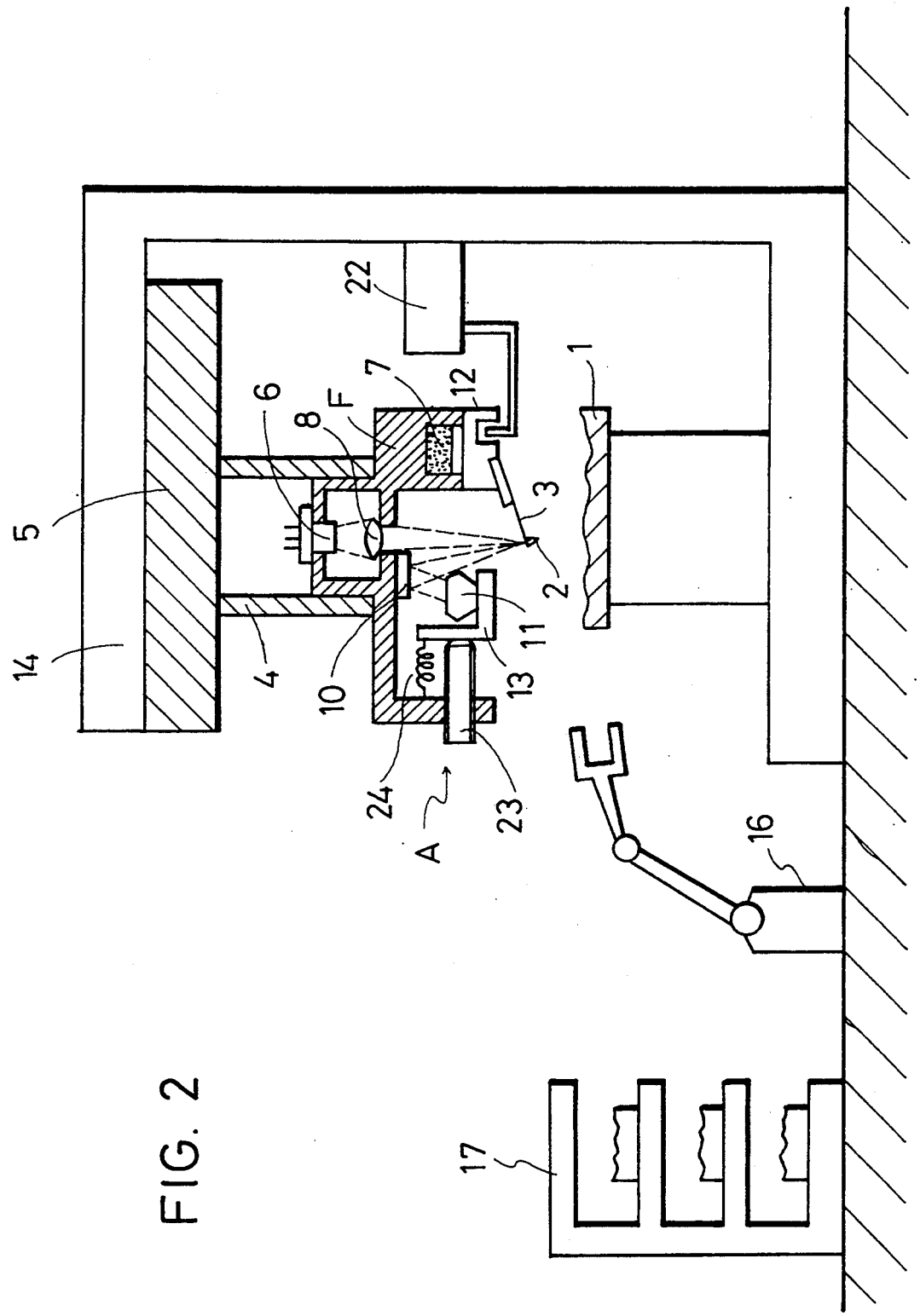
FIG. 2 is a block diagram showing another embodiment according to the present invention.
Figure 3:
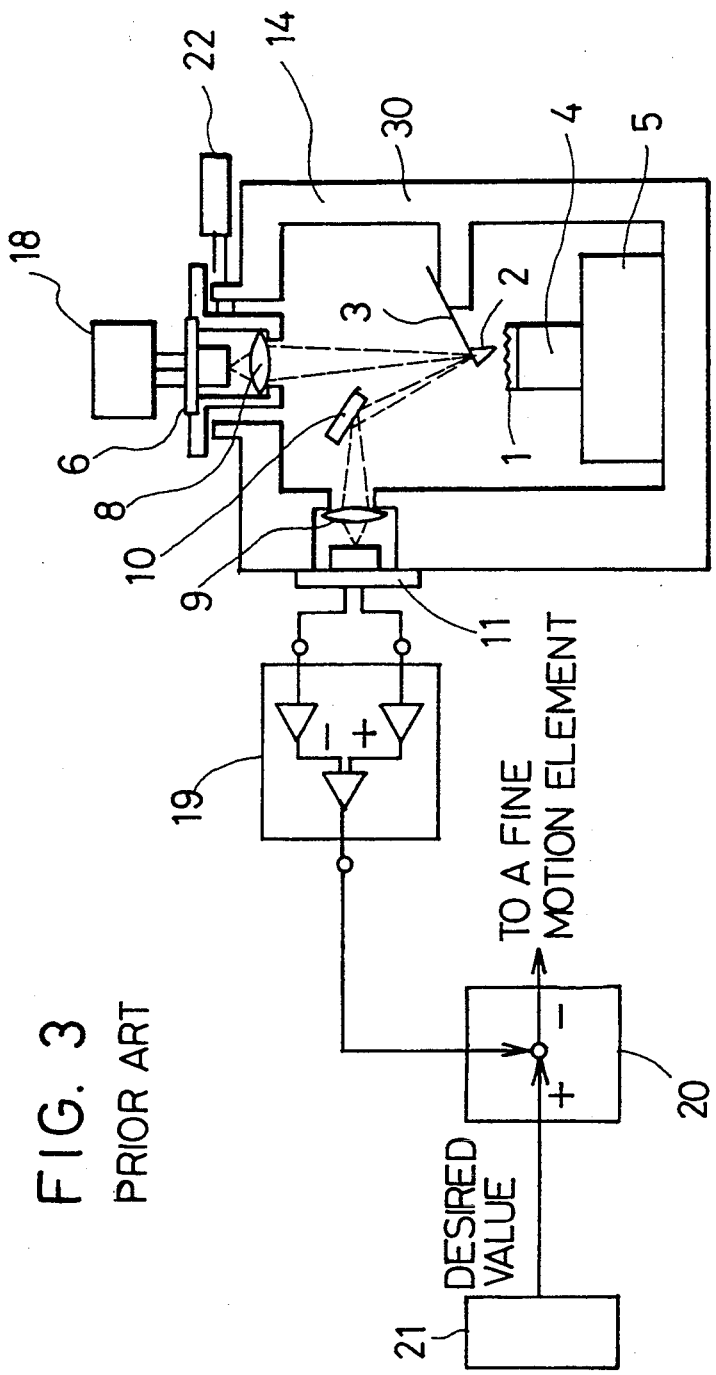
FIG. 3 is a block diagram showing the conventional optical lever type atomic force microscope.
Figure 4A:
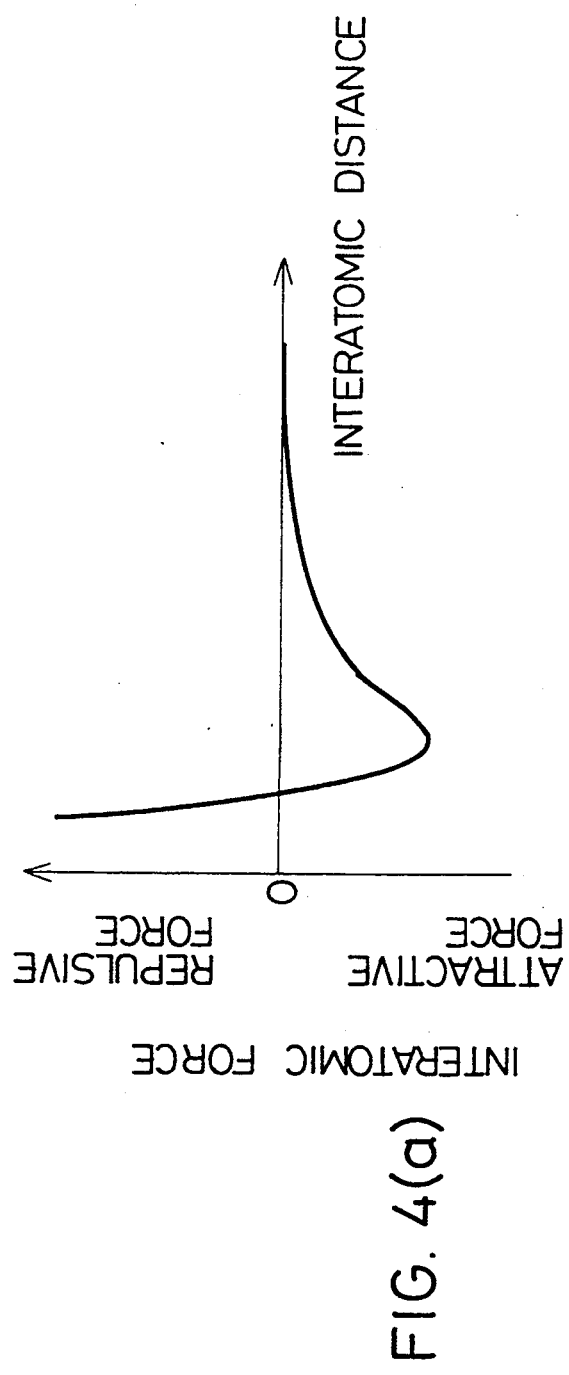
FIG. 4(a) and (b) is a conceptual view showing an operational principle of an atomic force microscope.
Figure 4B:
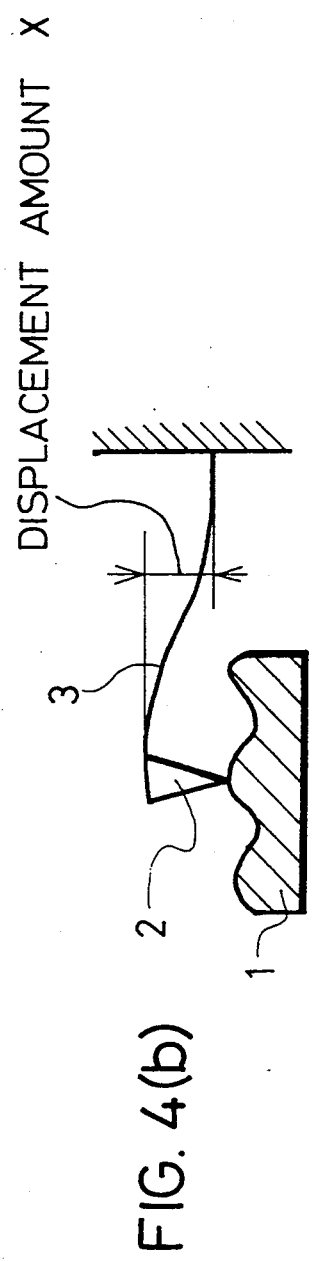

FIG. 2 shows another embodiment of a structure of an atomic force microscope according to the present invention. A displacement detecting system, which is formed of a spring element 3 and a photodetector element 11 and the like, is provided on a tip end of a fine motion element 4, which is attached on a coarse motion element 5. A sample 1 is automatically supplied from a sample stocker 17 by a carrier structure 16, thereby enabling a continuous measurement.

As hereinbefore fully described, according to the present invention, by arranging the spring element and the displacement detecting system onto the fine motion element-side, the semiconductor wafer and the optical disk substrate and the like are observed as it is with relaxation of limit to the sample size, consequently an advantage of non-destructive observation of the atomic force microscope can fully be utilized to facilitate a preparation of the sample.

Furthermore, an available combination with the metallurgical microscope and the carrier structure provides an atomic force microscope with a multiplex function which can easily be handled.

Still further, since the load added to the fine motion element is always constant, an adverse effect on the control system can be reduced.

What is claimed is:

1. An atomic force microscope comprising:
    a spring element having a detecting tip at an end thereof for converting an interatomic force generated between a surface of a sample and said detecting tip into a corresponding displacement;
    displacement detecting means for detecting the displacement of said spring element comprising a semiconductor laser for generating a laser beam and irradiating the laser beam on said spring element, and a photodetector for detecting the displacement of said laser beam reflected by said spring element;
    a coarse motion mechanism for moving said spring element three-dimensionally relative to the sample;
    a fine motion mechanism connected to said displacement detecting means for moving the detecting tip which is attached on the end of said spring element three-dimensionally within a region of the sample surface where said interatomic force acts; and
    control means for maintaining a predetermined distance between said sample and said detecting tip through said fine motion mechanism.

2. An atomic force microscope according to claim 1, further comprising means for movably supporting said spring element and for effecting horizontal adjustment of said spring element relative to said displacement detecting means to permit optical alignment between the spring element and the detecting means.

3. An atomic force microscope according to claim 1, further comprising means for adjusting the position of said photodetector in two dimensions.

4. An atomic force microscope according to claim 1, wherein said semiconductor laser comprises a semiconductor chip mounted in the microscope without any package.

5. An atomic force microscope according to claim 1, wherein said coarse motion mechanism supports said sample and moves said sample coarsely in three dimensions.

6. An atomic force microscope according to claim 1, wherein said coarse motion mechanism supports said fine motion mechanism and allows said fine motion mechanism to move coarsely in three dimensions.

7. An atomic force microscope comprising:
    a spring element having a detecting tip at one end thereof for converting an interatomic force into a displacement, the interatomic force being generated between a surface of a sample and the detecting tip;
    detecting means for detecting the displacement of the spring element, the detecting means comprising a semiconductor laser for generating and irradiating a laser beam on the spring element, and a segmented photodetector for detecting displacement of the laser beam reflected at the spring element and outputting corresponding displacement signals;
    a differential amplifier for amplifying the displacement signals output by the segmented photodetector and producing amplified signals;
    coarse motion means for moving the spring element relative to the sample three-dimensionally;
    fine motion means having the displacement detecting means attached thereto for moving the detecting tip three-dimensionally within a region of the sample surface where the interatomic force acts; and
    control means receptive of the amplified signals from the differential amplifier for controlling the fine motion means and the coarse motion means to maintain a predetermined distance between the surface of the sample and the detecting tip.

8. An atomic force microscope according to claim 7, wherein the semiconductor laser comprises a semiconductor chip mounted in the detecting means without a package.

9. An atomic force microscope according to claim 7, wherein the coarse motion means supports the sample and moves the sample coarsely in three dimensions.

10. An atomic force microscope according to claim 7, wherein the coarse motion means supports the fine motion means and moves the fine motion mechanism coarsely in three dimensions.

11. An atomic force microscope according to claim 7, further comprising a detector holder for holding the segmented photodetector, and adjusting means for adjusting the position of the detector holder to thereby adjust the position of the segmented photodetector.

12. An atomic force microscope according to claim 7, further comprising spring element position control means for controlling the position of the spring element, the spring element position control means comprising a movable holder connected to the spring element at the end thereof opposite the detecting tip, a magnet to magnetically attract the holder, and an optical axis adjustment means for moving the holder horizontally so as to align the optical axis of the semiconductor laser with a selected location on a rear surface of the spring.

* * * * *